(12) United States Patent
Uppala

(10) Patent No.: US 7,447,865 B2
(45) Date of Patent: Nov. 4, 2008

(54) SYSTEM AND METHOD FOR COMPRESSION IN A DISTRIBUTED COLUMN CHUNK DATA STORE

(75) Inventor: Radha Krishna Uppala, Bellevue, WA (US)

(73) Assignee: Yahoo ! Inc., Sunnyvale, CA (US)

( * ) Notice: Subject to any disclaimer, the term of this patent is extended or adjusted under 35 U.S.C. 154(b) by 322 days.

(21) Appl. No.: 11/226,668

(22) Filed: Sep. 13, 2005

(65) Prior Publication Data

US 2007/0061544 A1    Mar. 15, 2007

(51) Int. Cl.
    *G06F 12/02*    (2006.01)
(52) U.S. Cl. .................. 711/173; 711/216; 711/114
(58) Field of Classification Search .............. 711/173, 711/216; 708/203; 704/503
    See application file for complete search history.

(56) References Cited

U.S. PATENT DOCUMENTS

| 5,560,005 | A | * | 9/1996 | Hoover et al. ................. 707/10 |
| 5,657,468 | A | * | 8/1997 | Stallmo et al. .............. 711/114 |
| 5,768,532 | A | * | 6/1998 | Megerian .................... 709/245 |
| 5,794,229 | A | * | 8/1998 | French et al. ................... 707/2 |
| 7,174,293 | B2 | * | 2/2007 | Kenyon et al. .............. 704/231 |
| 2002/0091715 | A1 | * | 7/2002 | Coady ........................ 707/200 |

OTHER PUBLICATIONS

Agrawal, Narasayya, and Yang "Integrating Vertical and Horizontal Partitioning into Automated Physical Database Design" SIGMOD 2004, Jun. 13-18, 2004, Paris, France. p. 359-370.*
Roth and Van Horn "Database Compression" SIGMOD Record, vol. 22, No. 3, Sep. 1993 p. 31-39.*
Dr. Math "Ask Dr. Math Subject: Multiplying beyond Floating point calculations" Drexel University Aug. 9, 2003.*
Eda Baykan, Recent Research on Database System Performance, Jun. 28, 2005, published on Internet at www.csd.uoc.gr/~hy460/0506_fall/instructional_material.html.
Jingren Zhou, Kenneth A. Ross, A Multi-resolution Block Storage Model for Database Design, ideas, p. 22, Seventh International Database Engineering and Applications Symposium.
George Copeland, Setreg Khoshafian, A Decomposition Storage Model. ACM SIGMOD International Conference on Management of Data, pp. 268-279. ACM Press, 1985.

* cited by examiner

*Primary Examiner*—Hyung Sough
*Assistant Examiner*—Kenneth M Lo
(74) *Attorney, Agent, or Firm*—Robert O. Rolan

(57) ABSTRACT

An improved system and method for compression in a distributed column chunk data store is provided. A distributed column chunk data store may be provided by multiple storage servers operably coupled to a network. A storage server provided may include a database engine for partitioning a data table into the column chunks for distributing across multiple storage servers, a storage shared memory for storing the column chunks during processing of semantic operations performed on the column chunks, and a storage services manager for striping column chunks of a partitioned data table across multiple storage servers. Any data table may be flexibly partitioned into column chunks using one or more columns with various partitioning methods. Domain specific compression may be applied to a column chunk to reduce storage requirements of column chunks and increase transmission speeds for sending column chunks between storage servers.

20 Claims, 10 Drawing Sheets

SYSTEM AND METHOD FOR COMPRESSION IN A DISTRIBUTED COLUMN CHUNK DATA STORE

CROSS-REFERENCE TO RELATED APPLICATIONS

The present invention is related to the following United States patent applications, filed concurrently herewith and incorporated herein in their entireties:

"System for a Distributed Column Chunk Data Store," U.S. patent application Ser. No. 11/226,606; and "Method for a Distributed Column Chunk Data Store," U.S. patent application Ser. No. 11/226,667.

FIELD OF THE INVENTION

The invention relates generally to computer systems, and more particularly to an improved system and method for compression in a distributed column chunk data store.

BACKGROUND OF THE INVENTION

Distributed storage systems implemented either as a distributed database or a distributed file system fail to scale well for data mining and business intelligence applications that may require fast and efficient retrieval and processing of data. Distributed databases for large volumes of data, perhaps on the order of terabytes, may be traditionally implemented across several servers, each designed to host a portion of a database and typically storing a particular table of data. In some implementations, such a system may also store a horizontally partitioned table of data on one or more servers. For instance, the technique known as horizontal partitioning may be used to store a subset of rows of data in a table resident on a storage server. Queries for retrieving data from the distributed storage system may then be processed by retrieving rows of data having many associated columns of datum for which only one or few columns may be needed to process the query. As a result, the storage and retrieval of data in these types of systems is inefficient, and consequently such systems do not scale well for handling terabytes of data.

Typical transaction processing systems using a distributed database likewise fail to scale well for data mining and business intelligence applications. Such systems may characteristically have slow processing speed further during a failed transaction. During transaction processing a failed transaction may become abandoned and the database may be rolled back to a state prior to the failed transaction. Such database implementations prove inefficient for loading updates of large data sets on the order of gigabytes or terabytes.

Distributed file systems are also inadequate for storage and retrieval of data for data mining and business intelligence applications. First of all, distributed file systems may only provide low-level storage primitives for reading and writing data to a file. In general, such systems fail to establish any semantic relationships between data and files stored in the file system. Unsurprisingly, semantic operations for data storage and retrieval such as redistributing data, replacing storage, and dynamically adding additional storage are not available for such distributed file systems.

What is need is a way for providing data storage, query processing and retrieval for large volumes of data perhaps in the order of hundreds of terabytes for data warehousing, data mining and business intelligence applications. Any such system and method should allow the use of common storage components without requiring expensive fault-tolerant equipment.

SUMMARY OF THE INVENTION

Briefly, the present invention may provide a system and method for compression in a distributed column chunk data store. A distributed column chunk data store may be provided by multiple storage servers operably coupled to a network. A client executing an application may also be operably coupled to the network. A storage server provided may include a database engine for partitioning a data table into column chunks for distributing across multiple storage servers, a storage shared memory for storing the column chunks during processing of semantic operations performed on the column chunks, and a storage services manager for striping column chunks of a partitioned data table across multiple storage servers.

The database engine may include a loading services module for importing data into a data table partitioned into column chunks, a query services module for receiving requests for processing data stored as column chunks striped across multiple storage servers, a metadata services module for managing metadata about the column chunks striped across the plurality of storage servers, a transaction services module for maintaining the integrity of the information about semantic operations performed on the column chunks, and a storage services proxy module for receiving storage services requests and sending the requests for execution by the storage services manager. The storage services manager may include compression services for compressing the column chunks before storing to the column chunk data store and transport services for sending one or more compressed or uncompressed column chunks to another storage server.

Advantageously, a data table may be flexibly partitioned into column chunks using one or more columns as a key with various partitioning methods, including range partitioning, list partitioning, hash partitioning, and/or combinations of these partitioning methods. There may also be a storage policy for specifying how to partition a data table for distributing column chunks across multiple servers, including the number of column chunks to create. The storage policy may also specify the desired level of redundancy of column chunks for recovery from failure of one or more storage servers storing the column chunks. The storage policy may also specify how to assign column chunks to available storage servers. There may be a storage policy for each data table that may be different from the storage policy for another data table and may specify a different method for partitioning the data table into column chunks, a different level of redundancy for recovery from failure of one or more servers, and/or a different method for distributing the column chunks among the multiple storage servers.

The invention may partition any type of data table into column chunks for distributing across multiple storage servers. Domain specific compression may be applied to a column chunk to reduce storage requirements of column chunks and effectively decrease transmission time for transferring column chunks between storage servers. To do so, the domain of the data values in a column chunk may be determined to be a range of numeric values, strings of characters, sub-fields, key-value pairs, and so forth. A compression method developed for the specific data domain identified may then be applied to values in a column chunk to reduce the storage size of the column chunk. For example, numeric values within a range may be normalized to a bit representation of the range and then packed into a bit vector which may in turn be subsequently compressed. The domain of data values in a column chunk may include sub-fields which may be decomposed into separate column chunks. A compression method developed for the specific data domain of each of these separate column chunks may then be applied. Additionally, key-value pairs in a data domain of values may be decomposed into one or more arrays of values and a compression method developed for the specific data domain of each of these separate arrays of values may then be applied.

Other advantages will become apparent from the following detailed description when taken in conjunction with the drawings, in which:

DETAILED DESCRIPTION

Exemplary Operating Environment

Figure 1:
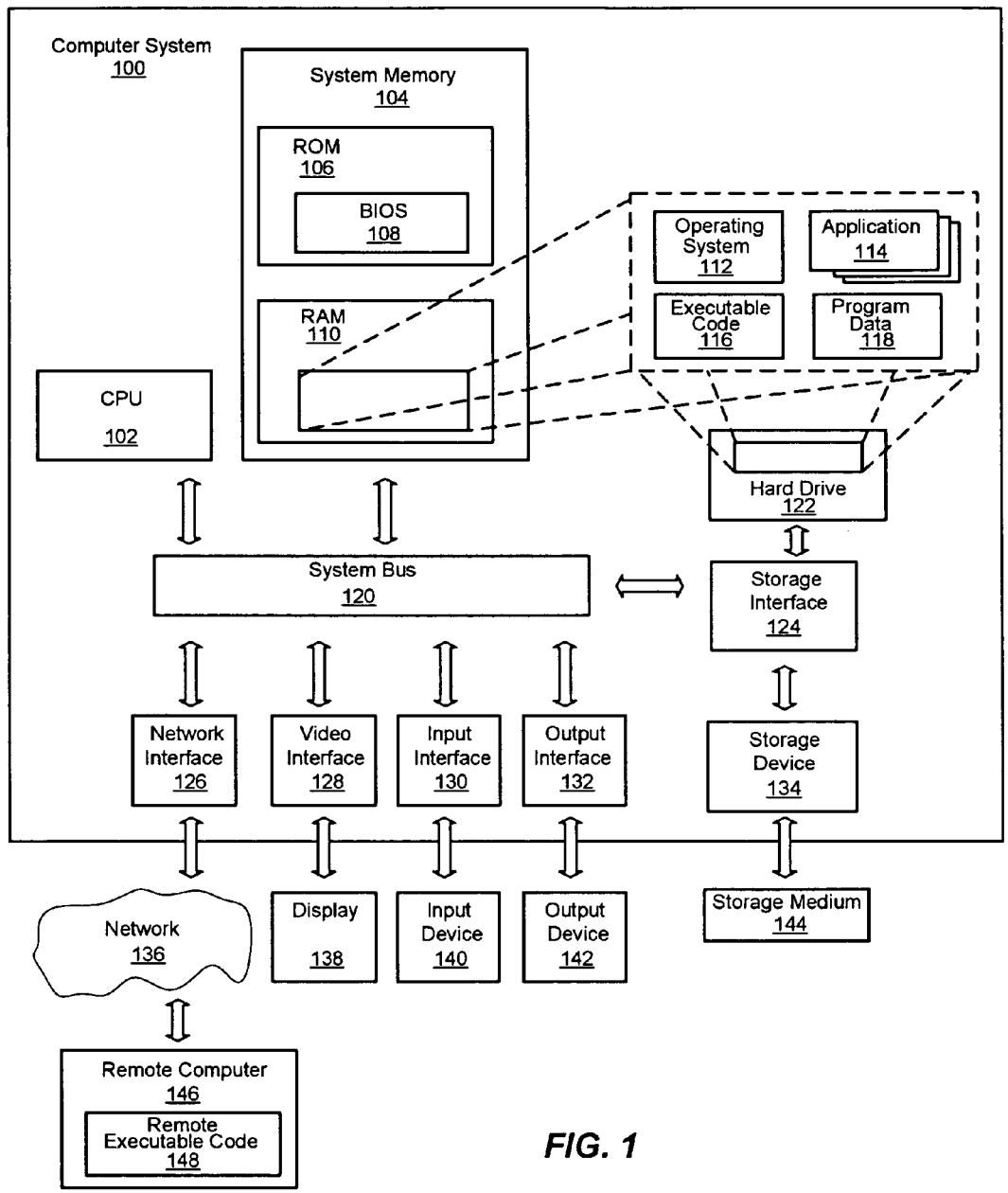
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may also embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Compression in a Distributed Column Chunk Data Store

The present invention is generally directed towards a system and method for compression in a distributed column chunk data store. More particularly, the present invention provides multiple storage servers operably coupled by a network for storing distributed column chunks of partitioned data tables. Any data table may be partitioned into column chunks and the column chunks may then be distributed for storage among multiple storage servers. To do so, a data table may be flexibly partitioned into column chunks by applying various partitioning methods using one or more columns as a key, including range partitioning, list partitioning, hash partitioning, and/or combinations of these partitioning methods. Additionally, data domain compression may be applied to a column chunk to reduce storage requirements of column chunks and increase transmission speeds for sending column chunks between storage servers. As will be seen, the data domain of the values in a column chunk may be determined to be a range of numeric values, a string of characters, sub-fields, key-value pairs, and so forth. A compression method developed for the specific data domain identified may then be applied to values in a column chunk to reduce the storage size of the column chunk. As will be understood, the various block diagrams, flow charts and scenarios described herein are only examples, and there are many other scenarios to which the present invention will apply.

Figure 2:
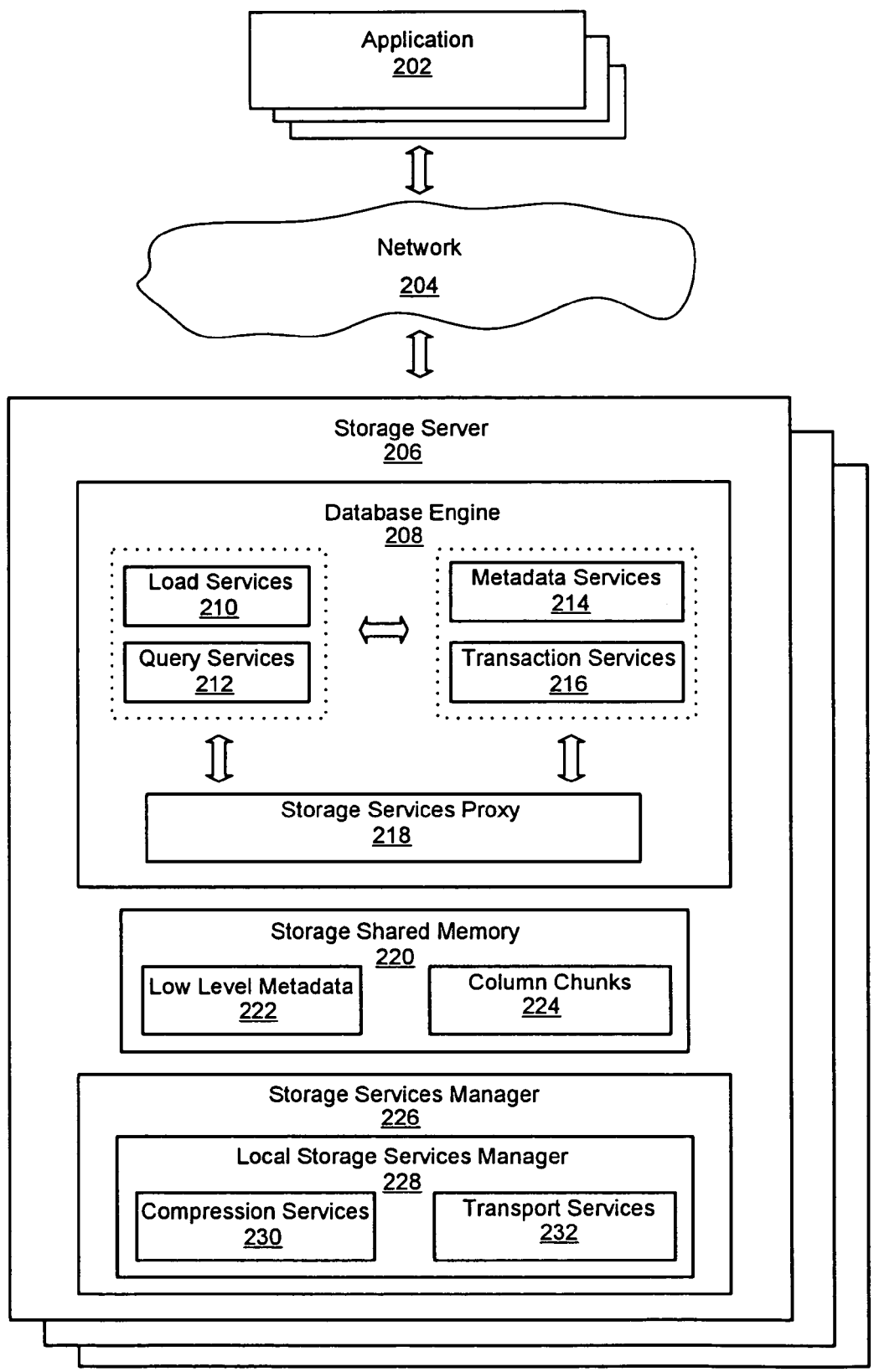
FIG. 2 is a block diagram generally representing an exemplary architecture of system components for a column chunk data store, in accordance with an aspect of the present invention.

Turning to FIG. 2 of the drawings, there is shown a block diagram generally representing an exemplary architecture of system components for a distributed column chunk data store. Those skilled in the art will appreciate that the functionality implemented within the blocks illustrated in the diagram may be implemented as separate components or the functionality of several or all of the blocks may be implemented within a single component. For example, the functionality for the storage services manager 226 may be included in the same component as the database engine 208. Or the functionality of transport services 232 may be implemented as a separate component.

As used herein, a column chunk data store may mean a large distributed system of operably coupled storage servers, each capable of storing column chunks. In various embodiments, one or more applications 202 may be operably coupled to one or more storage servers 206 by a network 204. The network 204 may be any type of network such as a local area network (LAN), a wide area network (WAN), or other type of network. In general, an application 202 may be any type of executable software code such as a kernel component, an application program, a linked library, an object with methods, and so forth. In one embodiment, an application may execute on a client computer or computing device, such as computer system environment 100 of FIG. 1 which may be operably coupled to one or more storage servers 206 by the network 204. An application 202 may include functionality for querying the column chunk data store to retrieve information for performing various data mining or business intelligence operations, such as computing segment membership, performing some aggregation of data including summarization, and so forth.

A storage server 206 may be any type of computer system or computing device such as computer system environment 100 of FIG. 1. The storage server may provide services for performing semantic operations on column chunks such as redistributing data, replacing storage, and/or adding storage and may use lower-level file system services in carrying out these semantic operations. A storage server 206 may include a database engine 208 storage shared memory 222, and a storage services manager 226. Each of these modules may also be any type of executable software code such as a kernel component, an application program, a linked library, an object with methods, or other type of executable software code.

The database engine 208 may be responsible, in general, for communicating with an application 202, communicating with the storage server to satisfy client requests, accessing the column chunk data store, and communicating with the storage services manager 226 for executing of storage operations, including accessing column chunks 224 in storage shared memory 220. The database engine 208 may include load services 210, query services 212, metadata services 214, transaction services 216 and a storage services proxy 218. Load services 210 may be used for importing data into the data tables. Query services 212 may process received queries by retrieving the data from the storage services manager 226 and processing the retrieved data. The load services 210 and query services 212 may communicate with the metadata services 214 and transaction services 216 using a communication mechanism such as interprocess communication. Each of these services may in turn communicate with the storage services proxy 218 to request services such as retrieving and loading column chunks into storage shared memory 220. The storage services proxy 218 may receive storage read and write requests and pass the requests off to the storage services manager 226 to execute the request.

The metadata services 214 may provide services for the configuration of the storage servers and may manage metadata for the database engine and the column chunk data store. The metadata may include, for example, data tables that reflect the current state of the system including the name of each server configured in the system, the load on each server, the bandwidth between servers, and many other variables maintained in the data tables. There may be dynamically updated tables and fixed tables of data. Fixed tables of data may include configuration tables, the defined logical tables, policies that may apply for partitioning the data table and storage distribution, and so forth. Some tables, such as configuration tables, may be generated dynamically by the system based upon system configuration. The metadata services 214 may include services to dynamically update metadata, such as configuration tables. In addition, metadata services 214 may include services to add or update fixed metadata such as adding new logical data table definitions or updating an existing logical data table definition.

The transaction services 216 may be responsible for maintaining active transactions in the system and may provide various services such as identifying and loading the appropriate version of column chunks. The transaction services 216 can also notify metadata services to update or commit metadata relating to a specific transaction. Generally, a transaction may include semantic operations that modify the system or that may be performed on data, including data loading, data optimization, data retrieval, updating existing data table, creating new tables, modifying the data schema, creating a new storage policy, partitioning data tables, recording the column chunk distribution in storage servers, and so forth. For each transaction such as incrementally updating a data table, there may be an indication of a start of a transaction and end of transaction when the update of the data table completes. Other examples of transactions may be executing a query, including generating intermediate data tables or other data tables, or optimizing cache storage of column chunks. To do so, the query services may use transaction services to process a query and the storage services manager may use transactions services while optimizing column chunk storage cache.

The storage shared memory 220 of the storage server 206 may include low level metadata 222 and column chunks 224. The low level metadata may include information about physical storage, such as the file name and file ID where a column chunk may be located, what the compressed size of a column chunk may be, what the uncompressed size of a column chunk may be, what the CRC on a column chunk may be for verifying that the column chunk is not corrupted on the disk storage, and so forth. The storage services manager 226 may generate low level metadata 222 by using the metadata such as policies, server configurations, resources available in metadata to generate physical storage for column chunks.

The storage services manager 226 may include a local storage services manager 228 that may provide compression services 230 and transport services 232. The compression services 230 may perform data domain compression and decompression of column chunks. For instance, data domain compression may be performed before storing the column chunks in storage and data domain decompression may be performed upon retrieving the column chunks from storage. Transports services 232 may provide services to transfer column chunks between servers. In one embodiment, a low level protocol may be employed upon a TCP/IP protocol stack for sending and receiving column chunks.

Figure 3:
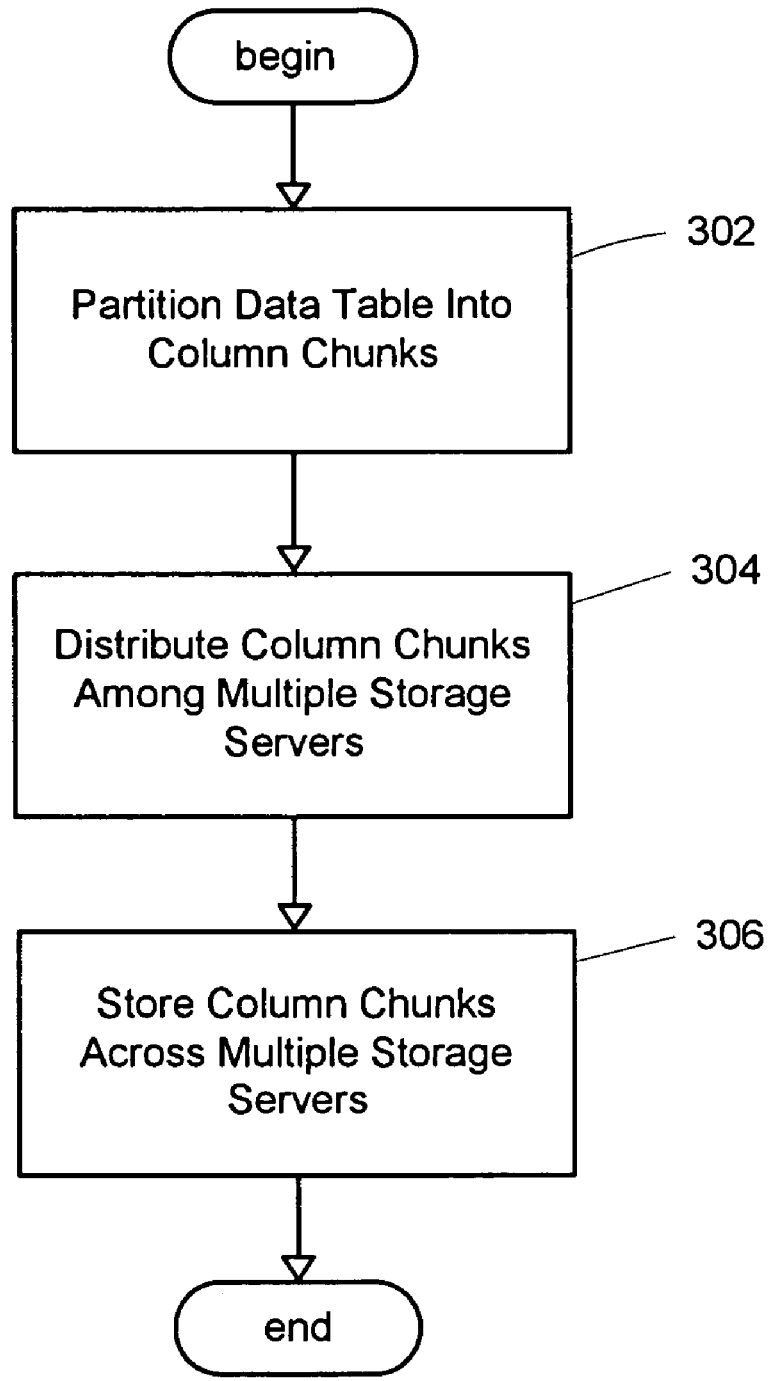
FIG. 3 is a flowchart generally representing the steps undertaken in one embodiment for storing column chunks among multiple storage servers in the column chunk data store, in accordance with an aspect of the present invention.

There are many applications which may use the present invention for storing large volumes of detailed data over long periods of time. Data mining, segmentation and business intelligence applications are examples among these many applications. FIG. 3 presents a flowchart generally representing the steps undertaken in one embodiment for storing column chunks among multiple storage servers in the column chunk data store. At step 302, a data table may be partitioned into column chunks. As used herein, a column chunk may mean a column of a data table partitioned using one or more columns as a key. Any type of data table may be partitioned into column chunks. For instance, a large fact table capturing transactions of users logging into a website may be partitioned into column chunks. In one embodiment, the data table may be partitioned into column chunks by performing column-wise partitioning whereby a partition may be specified by a set of columns. In another embodiment, a combination of some data table partitioning technique and column-wise partitioning may be performed. In this embodiment, the data table may be first partitioned into several data tables and then column-wise partitioning may be performed on the resulting data tables to create column chunks. To do so, those skilled in the art will appreciate that a data table may be partitioned into column chunks using any number of partitioning techniques such as range partitioning by specifying a range of value for a partitioning key, list partitioning by specifying a list of values for a partitioning key, hash partitioning by applying hashing to a partitioning key, combinations of these partitioning techniques, and other partitioning techniques known to those skilled in the art.

Once the data table may be partitioned into column chunks, the storage server may distribute the column chunks among multiple storage servers at step 304. For example, the column chunks of the data table may be striped across multiple storage servers. In one embodiment, each column chunk of the data table may be assigned to an available storage server using any assignment method including round robin order. In various embodiments, column chunks of a data table may be striped across multiple storage servers. As used herein, column chunk striping means striping column chunks of a data table across multiple storage servers. Any level of redundancy may be implemented in distributing the column chunks for recovery of one or more failed servers. For example, column chunk parity may be calculated to enable recovery from failure of one server. In an embodiment, a bitwise XOR operation may be performed on two column chunks to create a parity column chunk. Additional bitwise XOR operations may be performed with a parity column chunk and another binary representation of a column chunk to compute a parity column chunk for three column chunks. The resulting parity column chunk may then be assigned to an available server that does not store one of the three column chunks used to make the parity column chunk. In this way, any number of parity column chunks may be calculated and assigned to storage servers for recovery from failure of one or more storage servers. It should be noted that prior to performing a bitwise XOR operation on two column chunks of unequal length, the shorter column chunk may be padded with 0's until it become of equal length with the other column chunk.

Once the distribution of column chunks among the multiple storage servers may be determined, the column chunks may be stored on their assigned servers at step 306. After the column chunks have been stored, processing may be finished for storing column chunks among multiple storage servers in the column chunk data store.

Figure 4:
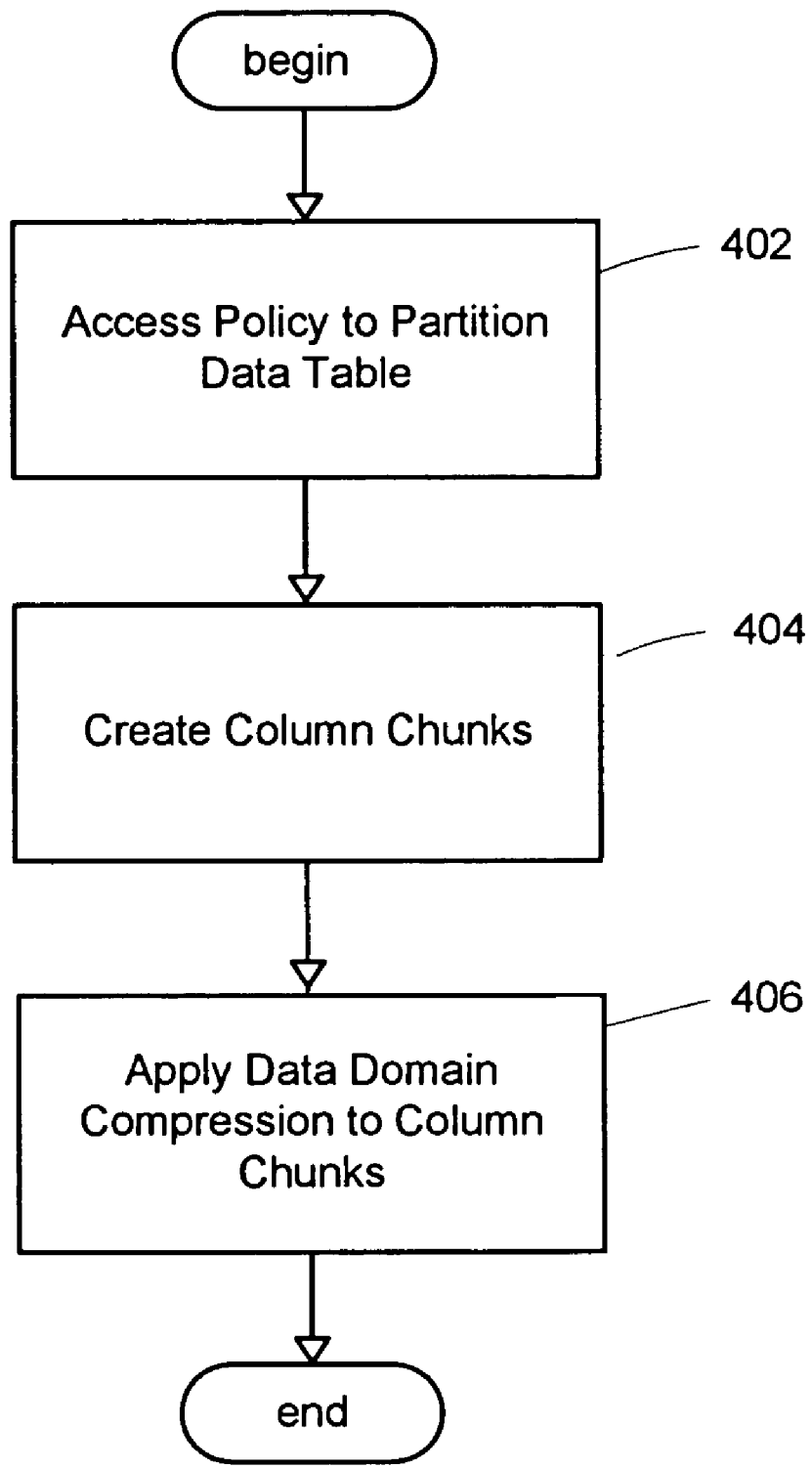
FIG. 4 is a flowchart generally representing the steps undertaken in one embodiment for partitioning a data table into column chunks, in accordance with an aspect of the present invention.

FIG. 4 presents a flowchart generally representing the steps undertaken in one embodiment for partitioning a data table into column chunks. At step 402, a policy for partitioning the data table into column chunks may be accessed. For example, there may be a policy stored as part of the metadata that may specify how the data table may be partitioned into column chunks and how the column chunks may be distributed among multiple storage servers in the column chunk data store. In one embodiment, the policy may specify the number of partitions into which a column should be divided. In various embodiments, the policy may specify the degree of redundancy of the column chunks for recovery upon failure of one or more storage servers.

Figure 5:
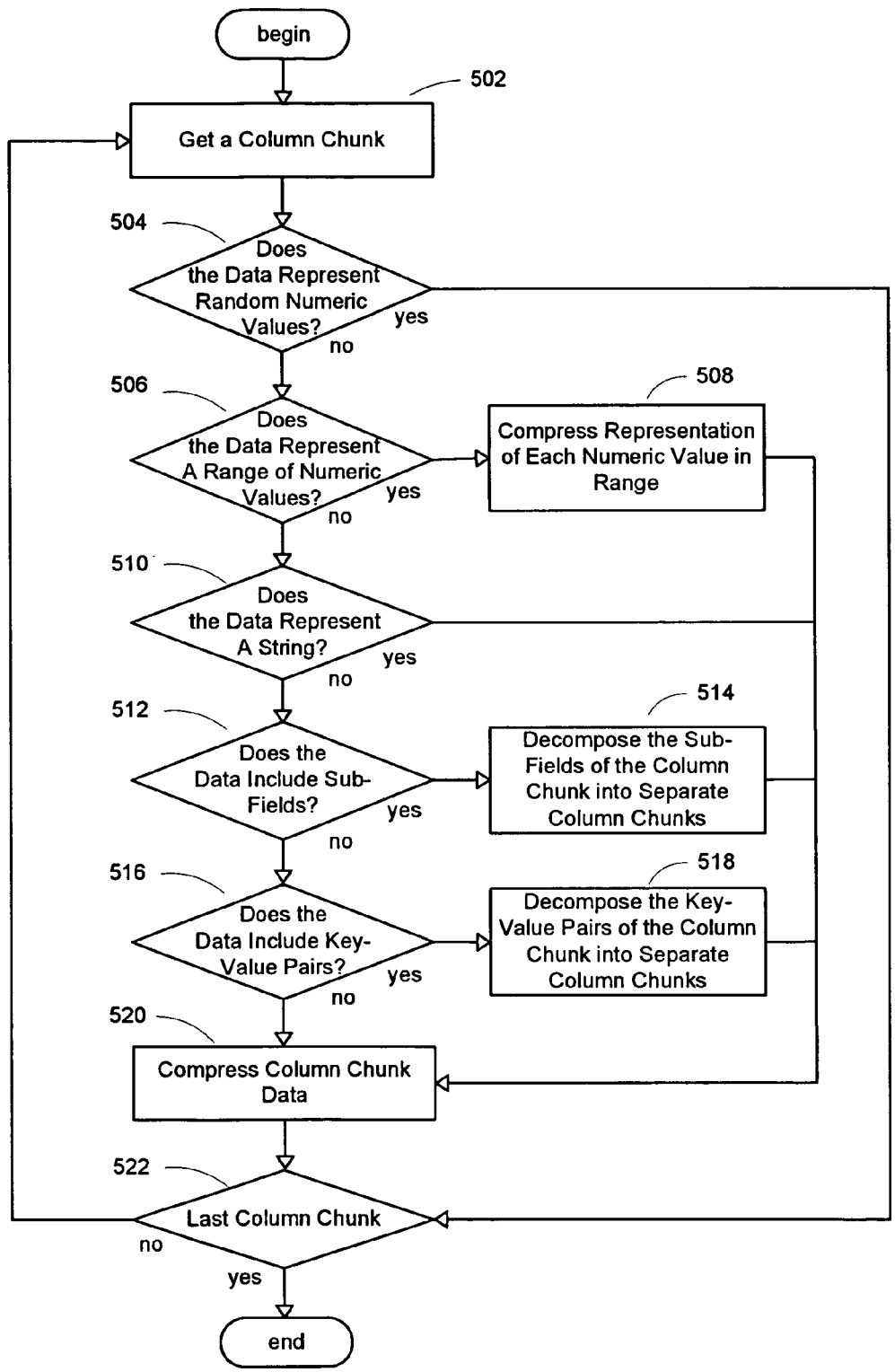
FIG. 5 is a flowchart generally representing the steps undertaken in one embodiment for applying data domain compression to column chunks, in accordance with an aspect of the present invention.

Any policy for partitioning the data table may then be applied at step 404 to create the column chunks. In an embodiment, partitioning may be performed on the data table by first partitioning the data table into multiple tables using range partitioning and then partitioning each of the multiple tables by applying column-wise partitioning. FIG. 5 describes this embodiment below in more detail. In various other embodiments, list partitioning, hash partitioning, or combinations of list, hash, and/or range partitioning may be applied to partition the data table into multiple tables and then column wise partitioning may be subsequently applied to each of the multiple data tables.

Once the column chunks may be created, then data domain compression may be applied to the column chunks at step 406. Data domain compression as used herein may mean applying a compression scheme designed to compress a specific data type. Given that values in a column of a column chunk may usually be the same data type and/or part of a specific data domain, partitioning a data table into column chunks may advantageously allow data in the column chunks to be compressed using a specific domain type compression scheme. For example, if a column of a column chunk may store a date that falls within a narrow range, such as between Jan. 1, 2000 and Dec. 31, 2010, the date field may be represented using the number of days since Jan. 1, 2000 rather than using a generic date representation. As another example, consider an address that may typically be stored as a string that may not compress well. By decomposing the address field into several subfields, such as street number, street name, city, state, and zip, each subfield may be represented as a separate sub-column having a specific data type that may compress well. As yet another example, consider an argument list of key-value pairs that may also be typically stored as a string that may not compress well. By decomposing the key-value pairs into separate column chunks, each column chunk may represent values having a specific data type that may compress well. Such compression may be performed using range-based compression of numeric values, decomposing a column chunk including sub-fields into separate column chunks, decomposing a column chunk including key-value pairs into separate column chunks, and so forth. After domain specific compression may be applied to the column chunks, processing for partitioning a data table into column chunks may be finished.

FIG. 5 presents a flowchart generally representing the steps undertaken in one embodiment for applying data domain compression to column chunks. At step 502, a column chunk may be obtained for compression. It may then be determined at step 504 whether the data domain represents random numeric values. For example, the numeric values may be hash values, such as a Message Digest Algorithm 5 ("MD5") hash of string data, that offer little opportunity for compression. In the embodiment illustrated in FIG. 5, there may be no attempt to apply compression to the values of the column chunk and it may be determined at step 522 whether the column chunk is the last column chunk. In various other embodiments, a generally available compression library may be used to attempt to compress the random numeric values, or a special compression scheme may be applied to attempt to improve the compression beyond that provided by generally available compression libraries.

Figure 7:
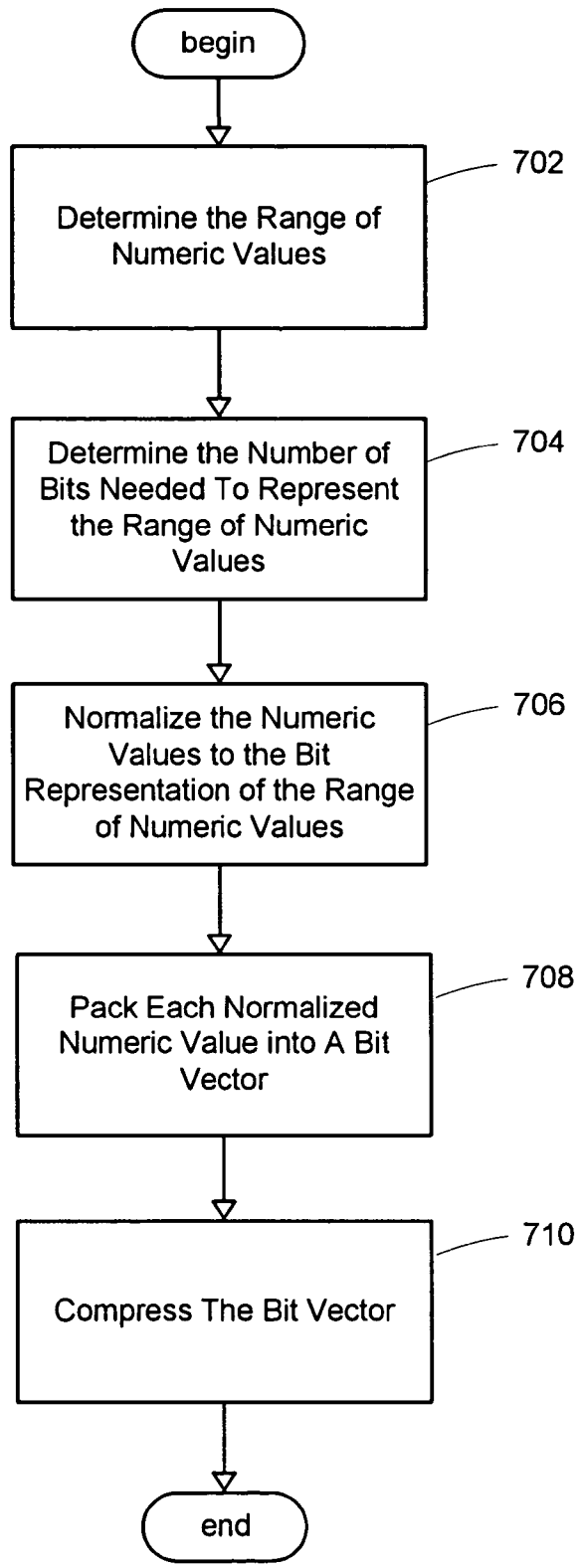
FIG. 7 is a flowchart generally representing the steps undertaken in one embodiment for compressing the representation of each numeric value in a range of numeric values included in a column chunk, in accordance with an aspect of the present invention.
Figure 8:
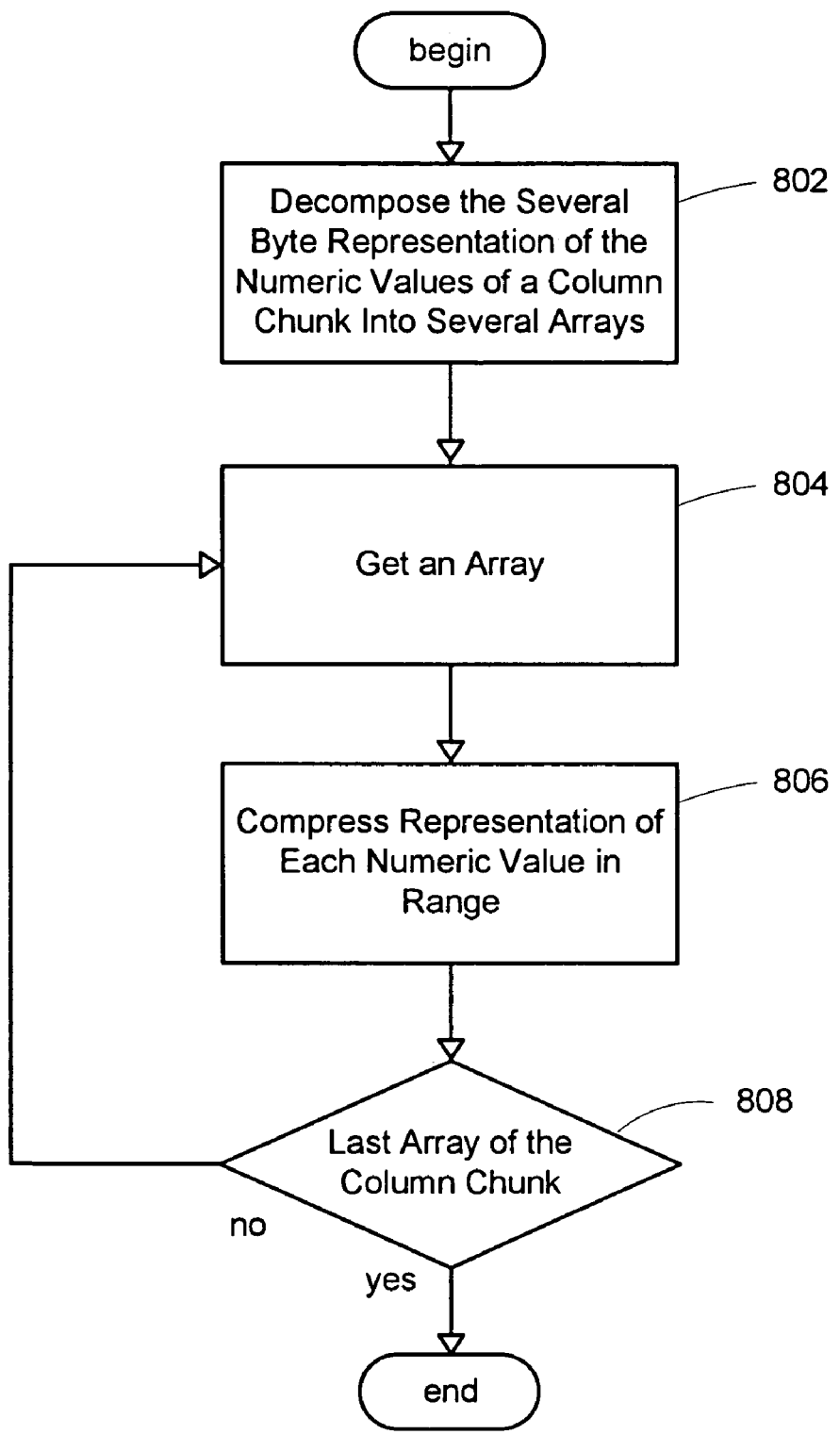
FIG. 8 is a flowchart generally representing the steps undertaken in another embodiment for compressing the representation of each numeric value in a range of numeric values included in a column chunk, in accordance with an aspect of the present invention

If the data domain does not represent random numeric values, then it may be determined at step 506 whether the data domain represents a range of numeric values. If so, the range of numeric values may be determined and the values may be opportunistically translated to a representation that requires less storage. Accordingly, if it may be determined at step 506 that the data domain represents a range of numeric values, then the representation of each numeric value in the range may be compressed at step 508. FIG. 7 and FIG. 8 below may generally represent the steps undertaken in various embodiments for compressing the representation of each numeric value in a range of numeric values. However, if the data domain does not represent a range of numeric values, then it may be determined at step 510 whether the data domain represents strings of characters. If so, then the values of the column chunks may be compressed at step 520. In an embodiment, a generally available compression library may be used to compress the string values.

Figure 6:
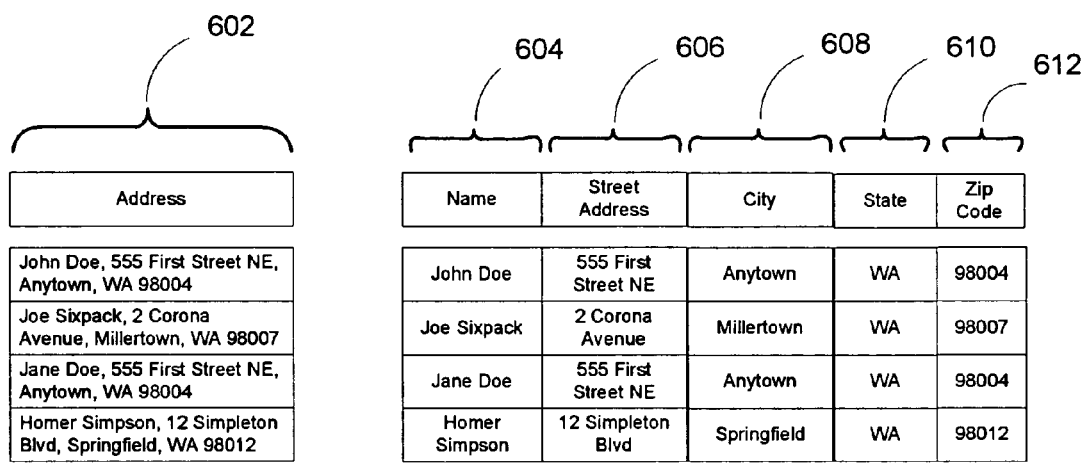
FIG. 6 is an exemplary illustration generally depicting a representation of sub-fields included in a column chunk which may be decomposed into separate column chunks, in accordance with an aspect of the present invention.

If the data domain does not represent strings of characters, then it may be determined at step 512 whether the data domain includes sub-fields. Any column chunk that may include data with a fixed number of fields may be decomposed into several columns, each of which may be compressed and stored independently. For example, FIG. 6 presents an exemplary illustration generally depicting a representation of sub-fields included in a column chunk which may be decomposed into separate column chunks. More particularly, FIG. 6 illustrates an address field 602 in a column chunk that may be decomposed into several subfields that may each have a specific type of data, such as a name of a person 604, a street address 606, a name of a city 608, an abbreviation of a state 610, and a zip code 612. If the data domain includes such sub-fields, then the sub-fields of the column chunk may be decomposed into separate column chunks at step 514. Each of these separate column chunks may be additional column chunks to which data domain compression may then in turn be applied. After separate column chunks have been created for the sub-fields of the column chunk, the values of the column chunk that were not sub-fields may be compressed at step 520. In an embodiment, a generally available compression library may be used to compress these values. It may be determined at step 522 whether the column chunk is the last column chunk and, if not, processing may continue at step 502 for applying data domain compression for the next column chunk.

Figure 9:
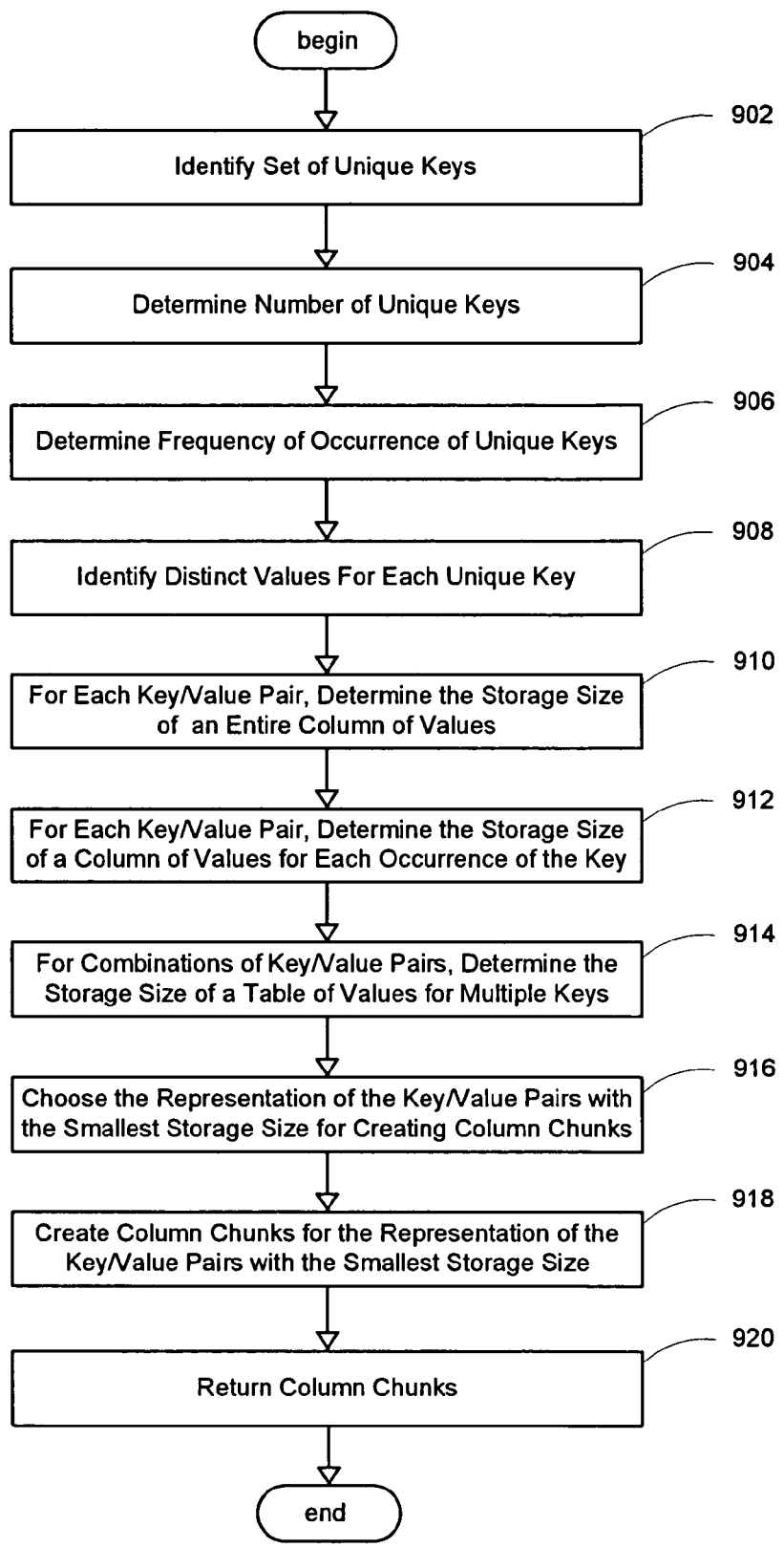
FIG. 9 is a flowchart generally representing the steps undertaken in an embodiment for compressing the representation of key-value pairs that may be included in a column chunk, in accordance with an aspect of the present invention.

Returning to step 512, if the data domain may not include sub-fields, then it may be determined at step 516 whether the data domain includes key-value pairs. Any column chunk that may include data that may include key-value pairs may be decomposed into several columns, each of which may be compressed and stored independently. As used herein, a key-value pair may mean a tuple that includes a key and an associated value. For instance, a Uniform Resource Locator ("URL") is typically represented as a string by a browser or other applications. The URL usually includes sub-fields such as a protocol, a server, a port, a path. These sub-fields may represent data domains that may be compressed by decomposition into separate column chunks as described above at step 514 of FIG. 5. However, a URL may also include a query string that may have a variable list of arguments represented by key-value pairs. Such key-value pairs in general may be compressed by decomposing the key-value pairs of the column chunk into separate column chunks. Accordingly, if it may be determined at step 516 that the data domain includes key-value pairs, then the key-value pairs of the column chunk may be decomposed into separate column chunks at step 518. FIG. 9 below may generally represent the steps undertaken in an embodiment for compressing the representation of key-value pairs that may be included in a column chunk. Each of these separate column chunks may be additional column chunks to which data domain compression may also in turn be applied. After separate column chunks have been created for the key-value pairs of the column chunk, the values of the column chunk that were not key-value pairs may be compressed at step 520. In an embodiment, a generally available compression library may be used to compress these values. It may be determined at step 522 whether the column chunk is the last column chunk and, if not, processing may continue at step 502 for applying data domain compression for the next column chunk. Otherwise, processing may be finished for applying data domain compression to column chunks.

FIG. 7 presents a flowchart generally representing the steps undertaken in one embodiment for compressing the representation of each numeric value in a range of numeric values. In general, the technique may be used to simply encode the values occurring within a determined range of numbers and may exclude values that occur outside the range of values. At step 702, the range of numeric values may be determined. For example, the maximum value in the range of numeric values may be 1492 and the minimum value in the range of numeric values may be 700. Next, the number of bits needed to represent the extent of the range of numeric values may be determined at step 704. For instance, the range of numeric values between 700 and 1492 may be encoded as a number between 0 and 792 by subtracting the minimum value of the range from a numeric value in the range. A number between 0 and 792 may be represented by 10 bits.

After the number of bits needed to represent the range of numeric values may be determined at step 704, the numeric values may then be normalized at step 706 for the bit representation of the range of numeric values. For example, the number 1490 may be translated to the number 790 by subtracting minimum value of the range 700, from 1490. Then each normalized values may be packed into a bit vector at step 708. By packing the normalized values into a bit vector as a stream of fixed size bit patterns, the size of the resulting bit vector may be substantially smaller than a stream of 16-bit integers that may otherwise be used to store the column of values. Finally, the bit vector may be compressed at step 710. In an embodiment, a generally available compression library may be used to compress the bit vector. After the bit vector may be compressed, processing may be finished for compressing the representation of each numeric value in a range of numeric values. This technique may achieve substantial reduction in the amount of storage required for a large set of numbers that have a small range, such as a range of numbers between 0 and 127 that may use 7 bits to represent the age of a person. Accumulated over millions of such values, such a compact representation may yield a significant reduction in storage otherwise required.

Where the set of values may represent a small set of numbers that have a wide range, a dictionary may be used that may often yield a better reduction in storage. To do so, the unique values may be identified and assigned integer indexes to represent those unique values. This may result in a column with a small range of numbers and a small dictionary that may serve as a reference for retrieving the original value.

In yet another approach, the number representing the values may be decomposed into subsets and then compression may be applied for each numeric value in the range of numeric values for that subset. This may be especially advantageous where the data domain of the numeric values may include specific sub-parts such as a credit card number. In this case, the numeric value may be represented by N-bytes which may be decomposed into N single bytes. For example, a 32-bit integer may be represented using 4 single bytes. Each sub-part may be a column of numeric values which can be compressed using the method described in detail with FIG. 7 above for compressing each numeric value in a range of numeric values.

Where the numeric values may be represented by several bytes, FIG. 8 presents a flowchart generally representing the steps undertaken in another embodiment for compressing the representation of each numeric value in a range of numeric values. At step 802, a numeric value represented by several bytes may be decomposed into several arrays. For instance, an N-byte representation of the numerical values in the column chunk may be decomposed into N arrays. The first byte may be put in the first array; the second byte may be put into the second array; and each subsequent byte may be put into the next corresponding array until the last byte may be put in the Nth array. At step 804, an array may be obtained for compression. The representation of each numeric value in the array may then be compressed at step 806 using the method described in detail with FIG. 7 above for compressing each numeric value in a range of numeric values. Once the numeric values in the array may be compressed, then it may be determined whether the array is the last array of the column chunk and, if not, processing may continue at step 804 for compressing each numeric value in a range of numeric values. Otherwise, processing may be finished.

Figure 10:
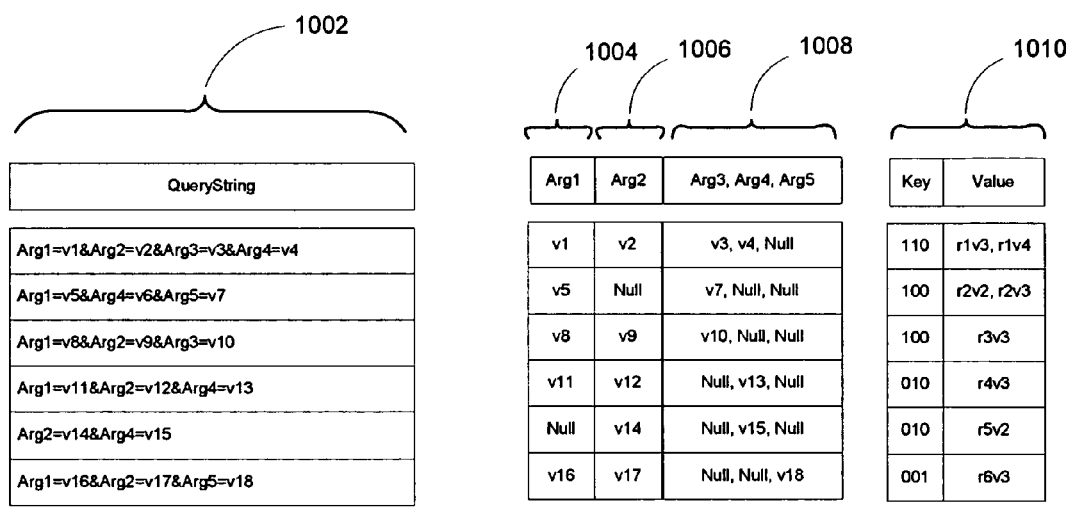
FIG. 10 is an exemplary illustration generally depicting a representation of key-value pairs included in a column chunk which may be decomposed into separate column chunks, in accordance with an aspect of the present invention.

FIG. 9 presents a flowchart generally representing the steps undertaken in an embodiment for compressing the representation of key-value pairs that may be included in a column chunk. For example, FIG. 10 presents an exemplary illustration generally depicting a representation of key-value pairs included in a column chunk which may be decomposed into separate column chunks. More particularly, FIG. 10 illustrates a query string 1002 that may be included in a column chunk. The query string 1002 may include several key-value pairs that may be represented by the assignment of a value to an argument. These key-value pairs included in a column may be decomposed into separate columns. To do so, the unique set of keys used as part of the key-value pairs may be identified at step 902. The number of unique keys may next be determined at step 904. Then the frequency of the occurrence of the unique keys may be determined at step 906. And the distinct values for each unique key may be determined at step 908.

For each key-value pair, the storage size for an entire column chunk may be determined at step 910. In an embodiment this may be determined by calculating the number of values in the column chunk multiplied by the size of a value. For instance, FIG. 10 illustrates a representation of an entire column 1004 for one key, namely Arg1. Note that a null value may be assigned in one embodiment for any key that may be absent, and, consequently, there may not be any value present. FIG. 10 also illustrates a representation of an entire column 1006 for another key, Arg2. Since each of columns 1004 and 1006 explicitly contains values for a key, the name of the key may not need to be stored which results in reducing storage size of the default representation of the query string, which also stores the name of the key in representing the key-value pairs. Such a storage representation for a key-value pair may be advantageous where there is a high frequency of occurrences of a key in a column chunk. Where there may be a low frequency of occurrences of a key in a column chunk, the storage size of a column chunk that may include values for just those occurrences of a key may then be determined at step 912. In an embodiment, this may be calculated by multiplying the number of values occurring for a particular key by the size of a row index plus the size of a value.

In yet another approach to calculating storage size where there may be moderately frequent occurrence of keys in a column chunk, the storage size of a table of values for multiple keys may be determined at step 914. This may be calculated in an embodiment by multiplying the number of rows in the column chunk by the size of a bit vector representing the number of unique keys plus the size of a list of integers that represent identifiers for the corresponding values. For example, column 1008 in FIG. 10 depicts a triplet of values corresponding to keys Arg3, Arg4, and Arg5. In an embodiment, the storage representation may be a table such as table 1010 depicted in FIG. 10 with a bit vector that indicates which keys are present in that row and a list of integers that represent identifiers for the corresponding values. For example, setting the first bit value to 1 may indicate that key Arg3 may be present in that row; setting the second bit value to 1 may indicate that key Arg4 may be present in that row; and setting the third bit value to 1 may indicate that key Arg5 may be present in that row. The first row of query string 1002 may include two keys Arg3 and Arg4 that may be represented in table 1010 by setting the first two bits of the bit vector to 1 for indicating that Arg3 and Arg4 are present in that row and including the list of integers r1v3 and r1v4 that may be identifiers for values v3 and v4 respectively.

In still another embodiment for calculating storage size of a key-value pair, keys that may occur sparsely may be decomposed into one or more separate column chunks of strings that represent a key-value pair by a numeric identifier and a value. By replacing the key with a numeric identifier, the storage representation of the key value pair may be reduced.

After determining the storage size for different storage representations of key-value pairs, the representation of the key-value pairs with the smallest storage size may be chosen at step 916 for decomposition of the key-value pairs into separate column chunks. At step 918, separate column chunks may then be created for the representation of the key-value pairs with the smallest storage size. The separate column chunks may then be returned at step 920. After the separate column chunks may be returned, processing may be finished for compressing the representation of key-value pairs that may be included in a column chunk.

Thus the present invention may advantageously support compression for any type of data stored in a column chunk, including subfields and key-value pairs. By partitioning a data table into column chunks, data in the column chunks may advantageously be compressed using a specific domain type compression scheme. Moreover, the system and method of the present invention may also flexibly allow any data type to be defined for importing data into the distributed column chunk data store and similarly supports applying any compression scheme designed to compress such data imported into the distributed column chunk data store. Thus the present invention may be used to compress timestamps, dates, and other data types of data imported into the distributed column chunk data store. For instance, a date may be decomposed into separate column chunks for the year, month and day subfields. Since the values in each of these column chunks may be represented as a range of numeric values, the representation of each numeric value in a range of numeric values may be compressed as described above in FIGS. 5-7.

As can be seen from the foregoing detailed description, the present invention provides an improved system and method for a distributed column chunk data store. Any data table may be flexibly partitioned into column chunks by applying various partitioning methods using one or more columns as a key, including range partitioning, list partitioning, hash partitioning, and/or combinations of these partitioning methods. Furthermore, domain specific compression may be applied to a column chunk to reduce storage requirements of column chunks and decrease transmission delays for transferring column chunks between storage servers. Such a system and method support storing detailed data needed by data mining, segmentation and business intelligence applications over long periods of time. As a result, the system and method provide significant advantages and benefits needed in contemporary computing, and more particularly in data mining and business intelligence applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented method for compressing a partitioned data table in a computer system, comprising:

partitioning a data table having a plurality of columns into column chunks for storing on one or more storage servers, each column chunk representing a partition of a column of the data table;

applying data domain compression to one or more column chunks of the partitioned data table for compressing the one or more column chunks; and storing the one or more compressed column chunks of the partitioned data table on the one or more storage servers.

2. The method of claim 1 wherein applying data domain compression to one or more column chunks of the partitioned data table comprises determining whether the data domain of values in a column chunk represents random numeric values.

3. The method of claim 1 wherein applying data domain compression to one or more column chunks of the partitioned data table comprises determining whether the data domain of values in a column chunk represents a range of numeric values.

4. The method of claim 3 further comprising compressing the representation of each numeric value in the range.

5. The method of claim 1 wherein applying data domain compression to one or more column chunks of the partitioned data table comprises determining whether the data domain of values in a column chunk represents a string of characters.

6. The method of claim 5 further comprising compressing the representation of the string of characters.

7. The method of claim 1 wherein applying data domain compression to one or more column chunks of the partitioned data table comprises determining whether the data domain of values in a column chunk includes sub-fields.

8. The method of claim 7 further comprising decomposing the sub-fields in the column chunk into separate column chunks.

9. The method of claim 8 further comprising compressing the values in the separate column chunks.

10. The method of claim 1 wherein applying data domain compression to one or more column chunks of the partitioned data table comprises determining whether the data domain of values in a column chunk represent key-value pairs.

11. The method of claim 10 further comprising decomposing the key-value pairs in the column chunk into one or more arrays of values.

12. The method of claim 11 further comprising compressing the key-value pairs in the one or more arrays of values.

13. A computer-readable storage medium having computer-executable instructions for performing the method of claim 1.

14. A computer-implemented method for compressing a partitioned data table in a computer system, comprising:
    partitioning a data table having a plurality of columns into column chunks for storing on one or more storage servers, each column chunk representing a partition of a column of the data table;
    determining whether the data domain of values in a column chunk represents a range of numeric values;
    determining the number of bits needed to represent the range of numeric values;
    normalizing the numeric values of the column chunk to the bit representation of the range of numeric values;
    packing each normalized numeric value into a bit vector to represent the column chunk;
    compressing the bit vector to create a compressed column chunk; and
    storing the compressed column chunk on one or more storage servers.

15. The method of claim 14 further comprising determining that the numeric values may be represented as several bytes.

16. The method of claim 15 further comprising decomposing the representation of the numeric values into bytes and assigning each byte of the numeric value to a separate array associated with that byte position.

17. A computer-readable storage medium having computer-executable instructions for performing the method of claim 14.

18. A computer-implemented method for compressing a partitioned data table in a computer system, comprising:
    partitioning a data table having a plurality of columns into column chunks for storing on one or more storage servers, each column chunk representing a partition of a column of the data table;
    determining whether the data domain of values in a column chunk represents key-value pairs;
    decomposing the key-value pairs in the column chunk into one or more arrays of values;
    compressing the key-value pairs in the one or more arrays of values to create a compressed column chunk; and
    storing the compressed column chunk of the partitioned data table on one or more storage servers.

19. The method of claim 18 further comprising:
    calculating a storage size of an entire column of values;
    calculating a storage size of a column of values for each occurrence of a key;
    calculating a storage size of a table of values for multiple keys; and
    determining the smallest storage size for creating compressed column chunks.

20. A computer-readable storage medium having computer-executable instructions for performing the method of claim 18.

* * * * *